3,518,446
ELECTROSTATIC ENGINE
Motoyoshi Nakanishi, 1511, 5-chome, Honcho,
Funabashi-shi, Chiba Prefecture, Japan
Filed June 23, 1967, Ser. No. 648,473
Claims priority, application Japan, June 25, 1966,
41/41,047
Int. Cl. B60l *11/18*
U.S. Cl. 290—45                                    6 Claims

ABSTRACT OF THE DISCLOSURE

An electrostatic engine comprising a diaphragm interposed between an opposed pair of electrodes. An electromagnetic means is provided to impress a high voltage on the electrodes. The voltage impressed has a frequency tuned to the intrinsic vibrational frequency of the diaphragm, thereby urging the diaphragm to vibrate in resonance. A mechanical means is provided for converting the vibrational movements of the diaphragm into a voluntary movement for the wheels of a vehicle.

---

Figure 1:
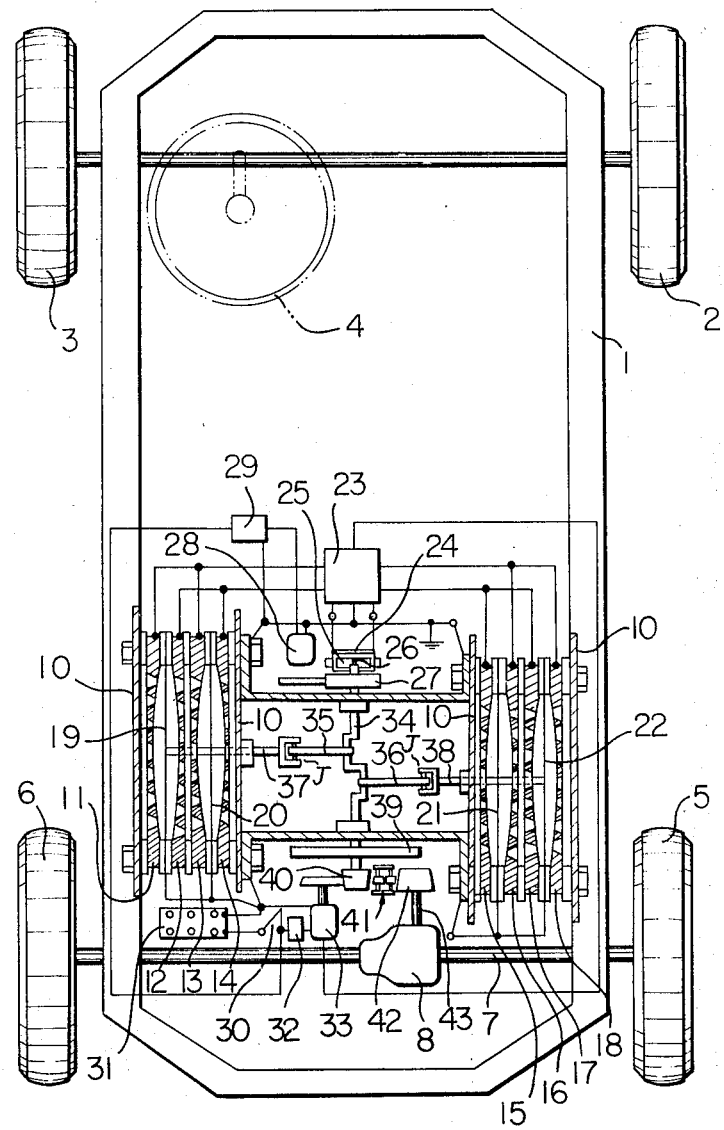

The present invention relates to a novel prime mover suitable for use as an automotive vehicle engine. More particularly, the invention concerns an entirely new type of automobile engine which can be called "an electrostatic engine," and is to make use of electrostatic energy in lieu of chemical energy of fuel, such as utilized in conventional gasoline or diesel engines and it is an object of the present invention to provide an "electrostatic engine" which converts the electrostatic energy of voltage supplied from, for example, an automobile battery into mechanical energy to drive a wheel axle, by way of first transforming the battery voltage into a high voltage, then impressing the high voltage on opposed pairs of electrode plates so as to urge a diaphragm interposed between each of the opposed pairs of electrodes to vibrate at a maximum rate of the vibrational frequency, and mechanically taking out the high frequency vibration of diaphragms for driving the automobile wheels.

It is generally known that each vibrating body has an intrinsic frequency of vibration corresponding to the specific configuration prepared thereof. Also well known is the phenomenon that, when applied with a positive or negative electric potential, virtually all material objects will undergo mutual attraction or repulsion.

Although, if prepared in an optimum configuration, a vibrating body can be made most readily responsive to exciting energy, externally applied thereto, and will vibrate intensely, it is further feasible by permitting the supply cycle of the exciting energy to be tuned to the vibrational frequency of the vibrating body so as to cause resonance to take place therein, to obtain not only a maximum amplitude of vibration of the vibrating body, but also a surprisingly great amount of power can be received, regardless of the relative low amount of the energy externally supplied.

It is an object of the present invention to provide an "electrostatic engine" based on the above principle, providing at a low cost a novel and highly efficient automobile engine, which relies for its power source merely on a relative compact battery and yet can bring about the advantage of producing a highly effective output. The "electrostatic engine" of the present invention has absolutely nothing to do with the use of fuel such as gasoline, and is advantageous also in that it can be operated without exhaust gas contaminating the atmosphere and can therefore have a wide variety of utility.

It is another object of the present invention to provide an "electrostatic engine" suitable for use, for example, as an automobile engine, in which the frequency of a high voltage to be impressed on opposed pairs of electrode plates is tuned to the intrinsic vibrational frequency of a diaphragm interposed between each pair of electrode plates and thereby causing the diaphragm to vibrate in resonance, showing maximum intensity and amplitude of vibration. The vibrational movement of the diaphragms is mechanically used to rotatably drive a wheel axle.

It is yet another object of the present invention to provide an "electrostatic engine," which comprises a starter motor and generator powered by a battery through an automatic starter, a magnet wheel having a magnet, a magnetic head disposed adjacent the magnet wheel and adapted to constantly induce an appropriate amount of electromotive force, a transformer having primary windings connected to be applied with the voltage induced by the electromotive force, the transformer for regulating both the frequency and phase of the voltage applied thereto and generating a high voltage. Opposed pairs of electrode plates are connected so as to be impressed with the high voltage induced at the secondary side of the transformer, and diaphragms are respectively interposed between each of the opposed pairs of electrodes and are adapted to undergo vigorous vibration in response to the potential applied to the electrodes. A crankshaft is connected to the diaphragms and adapted to mechanically take out the vibration of the diaphragms for the rotary driving of an axle or the like, the crankshaft being connected at its one end with the magnet wheel.

It is still another object of the present invention to provide an "electrostatic engine" as set forth above, which further comprises a frusto-conical variable speed pulley secured to the other end of the crankshaft, a breaker or distributor having an internal switching element or member at variable rates of speed and rotated by the pulley through an appropriate means and connected to the primary side of the transformer, and an exciting voltage coil, wherein the distributor is operable to open and close the electric circuit from a battery to the transformer through the exciting voltage coil in accordance with the rotation of the pulley and, accordingly, the internal switching member so that, from the input voltage supplied from the battery through the coil to the breaker, a signal voltage having a frequency comparable with the resonance frequency of the diaphragm can be generated at the transformer, wherein the transformer, while regulating the frequency and phase of the voltage applied to its primary side from the signal voltage together with the voltage induced at the magnetic head, produces high voltage at its secondary side, the high voltage generated being impressed on the pairs of opposed electrode plates so that the diaphragms interposed respectively between each pair of the electrodes can be vibrated in resonance at a maximum amplitude and intensity of vibration.

Figure 2:
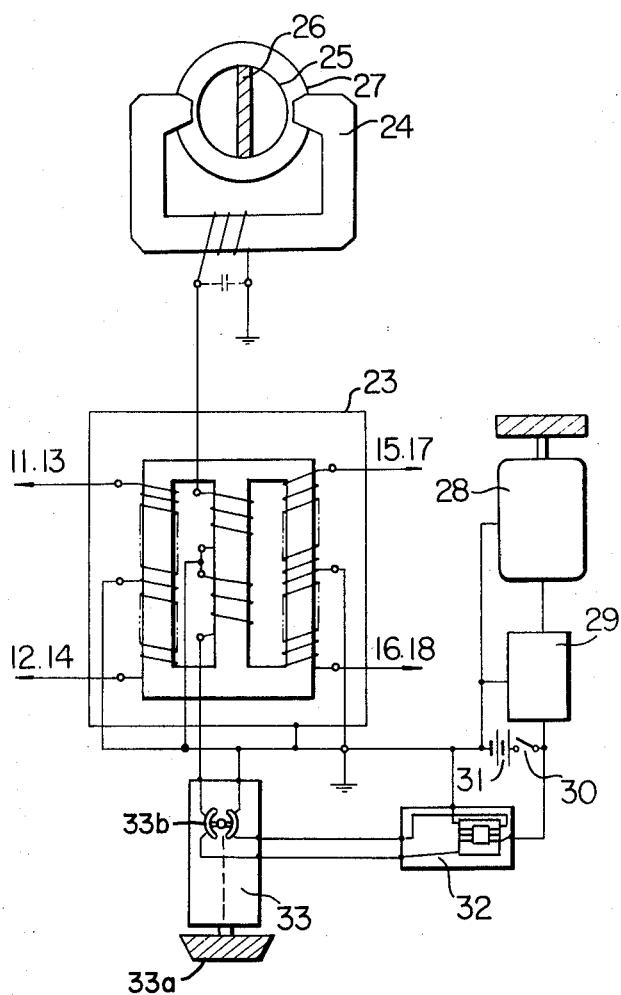

With the above and other objects in view, which will become apparent in the following detailed description, the present invention will be clearly understood in connection with the accompanying drawing, in which:

FIG. 1 is a plan view in section of an embodiment of the novel "electrostatic engine" of the present invention, shown as mounted on an automobile chassis; and FIG. 2 is a diagrammatic view of a portion of the electric circuit of the "electrostatic engine" shown in FIG. 1.

Referring now to the drawings and more particularly to FIG. 1, there is shown an automobile chassis 1 mounted with front wheels 2 and 3 connected to each other by an axle provided with a steering handle member 4. The chassis 1 is mounted also with rear wheels 5 and 6 connected by a shaft 7, to which a differential gear mechanism 8 is attached in a known manner.

The "electrostatic engine" of the present invention comprises an appropriate number of electrode plates surrounded by pairs of holder plates 10 secured at the the rear portion of the chassis 1 and, in the illustrated embodiment of the engine, two pairs of electrodes 11 and 12, and 13 and 14, respectively, are securely supported between a pair of plate members 10 mutually and tightly fastened by, for example bolting, at the left side of the automobile chassis. In a similar manner four electrodes 15, 16, 17 and 18 are disposed to the right side of the chassis. Between the opposed pair of electrodes 11 and 12, a first diaphragm 19 is interposed, which is composed of a thin metal or any other suitable material and is insulated appropriately from the electrode members. Similarly, between the electrode pairs 13 and 14, 15 and 16, and 17 and 18, a second, a third and a fourth diaphragm 20, 21 and 22 are interposed, respectively. One end each of the diaphragms is grounded.

To accommodate maximum amplitude of the diaphragm vibration, the opposing surface of each opposed pair of electrodes is formed arcuately concave as clearly shown in FIG. 1. Also, in order to positively release the air pressure which the diaphragm vibration will tend to cause, and to enable the diaphragms to vibrate substantially free of any impending factor, a number of orifices can be provided in the electrodes. In this respect, it is preferable to form the orifices as a frusto-conical section expanding in a direction away from the diaphragm so that a broadest possible area faces the diaphragm and will function as the electrode facing the same and can be retained in the electrode plate surfaces.

A frequency/phase regulating and high voltage producing transformer 23 is connected to each of the electrode plates. A magnetic head 24 is connected to transformer 23. Adjacent the magnetic head 24, a magnet wheel 25 and a magnet 26 are disposed. The magnet wheel 25, together with a pulley 27, is secured to one end of a crankshaft to be described later in more detail, and the pulley is rotated by a starter motor and a generator 28 connected through an automatic starter 29 and a power switch 30 to a battery 31. Through the switch 30 and an exciting voltage coil 32, the battery also feeds a breaker or distributor 33.

As mentioned above, the magnet wheel 25 and the pulley 27 are connected to one end of a crankshaft 34 so as to be rotated jointly. Linking rod members 35 and 36 connected to the crankshaft 34, respectively, at the left and right sides of the shaft are coupled through universal joints J with piston rods 37 and 38 which are secured to the left pair 19 and 20 and right pair 21 and 22 of electrodes, respectively. For purposes hereafter to be described in detail, a fly-wheel 39 is provided in the vicinity of the other end of the crankshaft, and a frustoconical variable speed pulley 40 is also secured to the other end of the crankshaft ahead of the location of the fly-wheel. The variable speed pulley 40 is structured such that it will be actuated to appropriately rotate the breaker 33 and, through clutch rollers 41, a driving pulley 42 as well, whereby the driving output is transmitted through a propeller shaft 43 to the differential gearing 8.

In operation and upon closing the power switch 30, the voltage from the battery 31 is supplied to the automatic starter 29 and the exciting voltage coil 32. The starter 29 thus energized drives the starter motor 28 to rotate, whereby the crankshaft pulley 27 and the crankshaft 34 rotate. Also the magnet wheel 25 and magnet 26 rotate, inducing electromotive force in the magnetic head 24. The AC power produced by the electromotive force thus induced is fed to the primary side of the frequency/phase regulating and high voltage producing transformer 23, and is taken out at the secondary side thereof in a form converted into a high voltage with the frequency and phase thereof appropriately regulated. Then the voltage is sent to electrodes 11 and 18 as clearly seen in FIG. 2. Concurrently, upon the rotary movement as stated above of the crankshaft, the left and right side link rods 35 and 36 operate to reciprocate the piston rods 38 and 39, respectively through the universal joints J, whereby the diaphragms 19, 20, 21 and 22 secured to the piston rods start to vibrate.

At this stage of the operation, while the electrodes 11 through 18 are impressed with an appropriate high voltage, the diaphragms are grounded, so that high potential variations will take place between each of the diaphragms and the electrodes with mutual attraction or repulsion being permitted to occur thereof; that is, the diaphragms vibrate electrically, besides mechanically.

Whereas the intensity and amplitude of the diaphgram vibration can be increased depending upon an appropriate selection of material and optimum preparation of configuration of the electrodes and the diaphragms, it is further contrived in the present invention as follows:

The variable speed pulley 40, which is secured to the rear end portion of the crankshaft 34, operates to rotate the breaker 33 through a pulley 33a which is engageable with the pulley 40. More practically, the breaker 33 internally contains a rotary member 33b, operable as a movable contact, mounted to the shaft (shown by a broken line in FIG. 2) of the pulley 33a. When rotated by the crankshaft 34 through the pulleys 40 and 33a, the rotary member 33b functions to supply and cut off the voltage from battery 31 through the coil 32 to the primary windings of the transformer 23. Thus, the signal voltage applied to the transformer, together with the voltage induced at the magnetic head 24 and applied to the transformer, generates at the secondary windings of the transformer a high voltage having a frequency which can be tuned to correspond to the resonance frequency of the diaphragm, and the high voltage is sent to the electrodes 11 and 13, 12 and 14, 15 and 17, and 16 and 18 as clearly shown in FIG. 2. Over an appropriate regulation of the rotation velocity of the breaker 33b, which regulation is readily attainable by variably regulating the engaging position of the pulley 33a and pulley 40, the frequency of the high voltage can with ease be turned to the intrinsic vibrational frequency of the diaphragm. Accordingly, under the influence of electrode plates impressed with high voltage having a frequency tuned to the frequency of the intrinsic vibration of diaphragm, the diaphragms are caused to undergo maximum amplitude and intensity of vibration.

The high frequency vibrations of the diaphragms are transmitted mechanically to the piston rods 37 and 38 and, as the result thereof, the crankshaft 34 rotates at an accordingly high velocity. Further, now since the crankshaft 34 is provided with fly-wheel 39, a stable and powerful high velocity can be obtained. From the variable speed pulley 40 placed at the rear end of the crankshaft, through the clutch 41, the high velocity rotation will gradually be transmitted to the drive pulley 42. That is, for starting drive of the automobile, the clutch 41 is first to be engaged, on the one hand, with the smaller diameter portion of the variable speed pulley 40 and, on the other hand, with the larger diameter portion of the drive pulley 42 so that only a smaller load is to be charged to the variable speed pulley 40 to enable the drive pulley 42 to gradually start rotating with relative ease. The rotary movement of the pulley 42 is then transmitted to the differential gears 8 through the propeller shaft 43 to eventually drive the rear wheel axle 7 and the wheels 5 and 6. As the running speed of the automobile increases and the load on the pulley 40 decreases, the clutch rollers 41 are shifted to engage the larger diameter portion of the pulley 40 and the smaller diameter portion of the drive pulley 42, to accelerate the automobile movement.

To further detail the operation of the starter motor and generator 28, which is electrically connected to the automatic starter 29, the same will function as a main prime mover of the crankshaft during the time when the operation of the "engine" of the invention is limited only at a level lower than the resonance frequency of the diaphragm or when the automobile is about to start moving or is moving at a low initial rate of velocity. In other words, the motor 28 is energized from the battery 31 through the automatic starter 29, and rotationally drives by way of the pulley 27 the crankshaft 34 to move the automobile, with the speed of motion thereof being gradually increased.

When the crankshaft 34 is thus rotated, the breaker 33 intermittently leads the voltage to the transformer 23 from the battery 31 through the coil 32, and the transformer supplies to the electrode plates voltage of a frequency which gradually approaches the resonance frequency of the diaphragm. Accordingly, during the time when the "engine" is in operation at a level corresponding to the resonance frequency of the diaphragm, the starter motor 28 is disengaged with the pulley 27 and concurrently removed from the battery circuit by the automatic starter 29, at which time the diaphragms drive the crankshaft rotatably by the amplified vibration thereof.

The "engine" of the present invention is in operation at an operational rate exceeding the resonance vibration frequency, in such a case, for example, where the automobile is descending a slope; then the starter motor and generator 28 will function as a generator charging the batter 31. That is, the generator 28 again operatively contacts the pulley 27 by the automatic starter 29, and is rotated by the crankshaft which is rotating at a high speed exceeding the level of the resonance vibration, resulting in the generation of direct current. The electric energy thus generated charges the battery 31 through the automatic starter 29.

While I have disclosed one embodiment of the present invention, it is to be understood that this embodiment is given by example only and not in a limiting sense.

I claim:
1. An electrostatic engine comprising
at least one opposed pair of electrodes,
a diaphragm interposed between each of said at least one opposed pair of electrodes,
an electro-magnetic means for impressing onto said electrodes a high voltage of a frequency turnable with the intrinsic vibrational frequency of said diaphragm and urging said diaphragm to vibrate to the maximum extent due to resonance caused thereto, and
a mechanical means for taking out the vibration of said diaphragm for mechanical driving.
2. The electrostatic engine, as set forth in claim 1, further comprising
an automobile battery,
an automatic starter,
a starter motor and generator powered by said automobile battery through said automatic starter,
a crankshaft,
a magnetic wheel having a magnet secured to one end of said crankshaft, said crankshaft being adapted to be rotated by said starter motor and generator and constituting a part of said mechanical means, and
a magnetic head situated adjacent said magnetic wheel, said magnetic wheel and said magnetic head being operatively connected such that the rotation of the former constantly induces an electromotive force to the latter.
3. The engine, as set forth in claim 2, wherein
said at least one opposed pair of electrodes includes a pair of said electrode plates at each of the left and the right sides of said crankshaft, and
each of said pair of electrode plates holding therebetween one of said diaphragms.
4. The engine, as set forth in claim 2, further comprising
a frequency/phase regulating and high voltage producing transformer connected to said magnetic head and said pair of electrodes,
a variable speed pulley in a frusto-conical configuration secured to the other end of said crankshaft, and
a breaker rotatably connected to said pulley and operatively to said battery, said breaker functioning to generate signal power of a frequency to urge said diaphragm to vibrate at a maximum, said signal power being transmitted, together with the voltage induced by said magnetic head, to said frequency/phase regulating and high voltage producing transformer and thereby converted into a high voltage, said high voltage being impressed onto at least one of said opposed pair of electrodes so as thereby to force the diaphragm to resonate to a maximum extent of intensity and amplitude.
5. The engine, as set forth in claim 3, wherein
said pair of electrode plates are arcuately cut at their facing surfaces.
6. The engine, as set forth in claim 5, wherein
said pair of electrode plates are provided with orifices having a frusto-conical configuration expanding in the direction away from said diaphragm.

References Cited

UNITED STATES PATENTS 2,975,307  3/1961  Schroeder et al. _____ 310—6
3,317,983  5/1967  De Wit et al. _____ 310—5 X ORIS L. RADER, Primary Examiner W. E. DUNCANSON, Jr., Assistant Examiner U.S. Cl. X.R.
290—50; 310—6